United States Patent
Shinohara

(10) Patent No.: US 9,918,147 B2
(45) Date of Patent: Mar. 13, 2018

(54) TRANSMISSION APPARATUS AND TRANSMISSION METHOD

(71) Applicant: FUJITSU LIMITED, Kawasaki-shi, Kanagawa (JP)

(72) Inventor: Shota Shinohara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 242 days.

(21) Appl. No.: 14/677,092

(22) Filed: Apr. 2, 2015

(65) Prior Publication Data

US 2015/0365740 A1    Dec. 17, 2015

(30) Foreign Application Priority Data

Jun. 13, 2014 (JP) .................................. 2014-122814

(51) Int. Cl.
| | |
|---|---|
| *H04B 10/00* | (2013.01) |
| *H04Q 11/00* | (2006.01) |
| *H04L 12/741* | (2013.01) |
| *G06F 13/40* | (2006.01) |
| *H04B 10/40* | (2013.01) |
| *G06F 13/42* | (2006.01) |

(52) U.S. Cl.
CPC ......... *H04Q 11/0005* (2013.01); *G06F 13/40* (2013.01); *G06F 13/4291* (2013.01); *H04B 10/40* (2013.01); *H04L 45/745* (2013.01); *H04Q 2011/0033* (2013.01)

(58) Field of Classification Search
None
See application file for complete search history.

(56) References Cited

U.S. PATENT DOCUMENTS

| | | | | |
|---|---|---|---|---|
| 5,263,172 A | * | 11/1993 | Olnowich | .................. G06F 1/08 713/501 |
| 2005/0232367 A1 | * | 10/2005 | North | ...................... H04B 3/56 375/257 |
| 2013/0243140 A1 | * | 9/2013 | Buhl | ..................... H04J 3/0638 375/362 |
| 2014/0136875 A1 | * | 5/2014 | Chen | .................. G06F 13/4291 713/501 |

FOREIGN PATENT DOCUMENTS

| | | |
|---|---|---|
| JP | 2000-132506 | 5/2000 |
| JP | 2003-141061 | 5/2003 |
| JP | 2004-310401 | 11/2004 |
| JP | 2005-310154 | 11/2005 |
| JP | 2009-69946 | 4/2009 |

OTHER PUBLICATIONS

Japanese Office Action dated Jan. 23, 2018 from Japanese Application No. 2014-122814, 6 pages.

* cited by examiner

*Primary Examiner* — Ken N Vanderpuye
*Assistant Examiner* — David Lambert
(74) *Attorney, Agent, or Firm* — Staas & Halsey LLP

(57) ABSTRACT

A transmission apparatus includes: a plurality of first devices; and a second device configured to output a data signal shared by the plurality of first devices and respective first clock signals to each of the plurality of first devices, and to control the plurality of first devices individually based on the respective first clock signals.

11 Claims, 7 Drawing Sheets

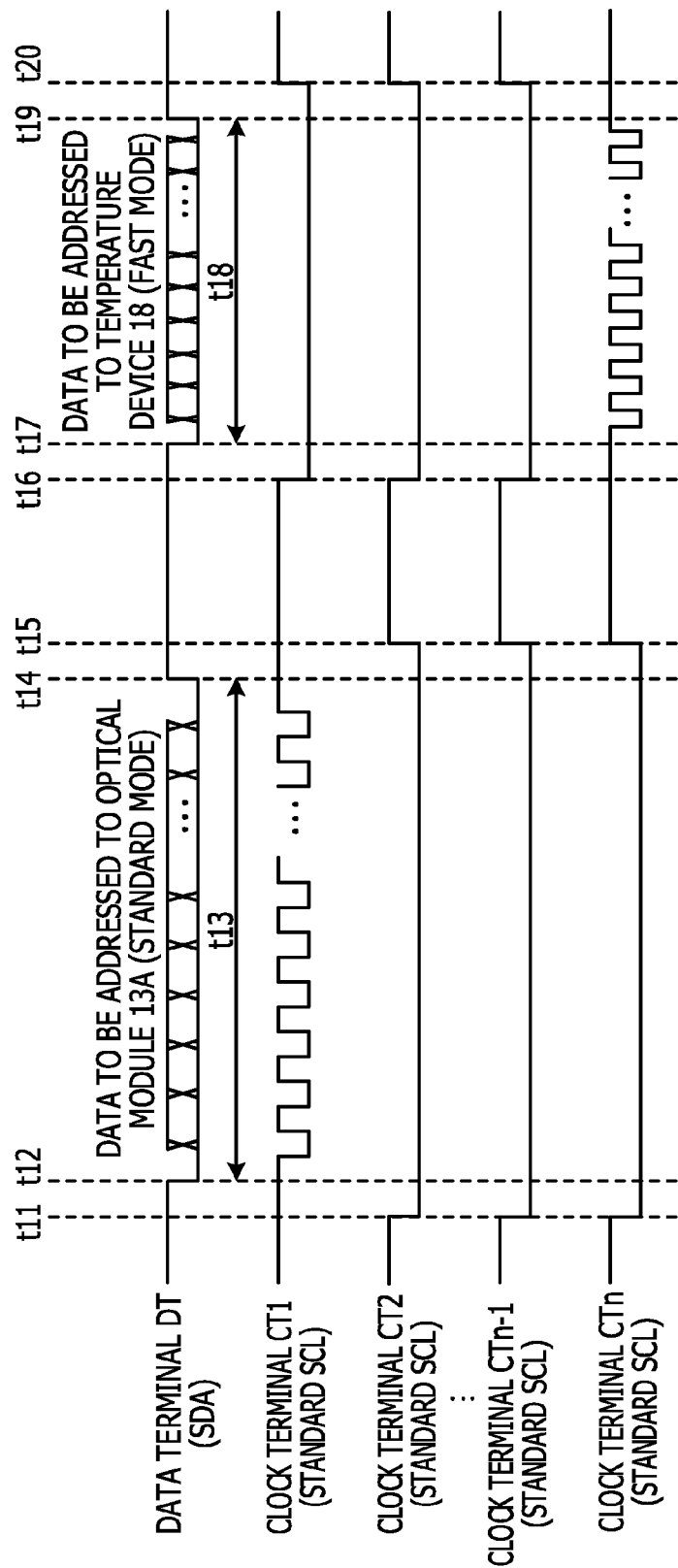

TRANSMISSION APPARATUS AND TRANSMISSION METHOD

CROSS-REFERENCE TO RELATED APPLICATION

This application is based upon and claims the benefit of priority from the prior Japanese Patent Application No. 2014-122814 filed on Jun. 13, 2014, the entire contents of which are incorporated herein by reference.

FIELD

The embodiments discussed herein are related to a transmission apparatus and a transmission method.

BACKGROUND

Related techniques are disclosed in, for example, Japanese Laid-Open Patent Publication No. 2009-69946, Japanese Laid-Open Patent Publication No. 2003-141061, Japanese Laid-Open Patent Publication No. 2004-310401, and Japanese Laid-Open Patent Publication No. 2005-310154.

SUMMARY

According to one aspect of the embodiments, a transmission apparatus includes: a plurality of first devices; and a second device configured to output a data signal shared by the plurality of first devices and respective first clock signals to each of the plurality of first devices, and to control the plurality of first devices individually based on the respective first clock signals.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a waveform diagram illustrating other exemplary waveforms.

DESCRIPTION OF EMBODIMENTS

Figure 1:
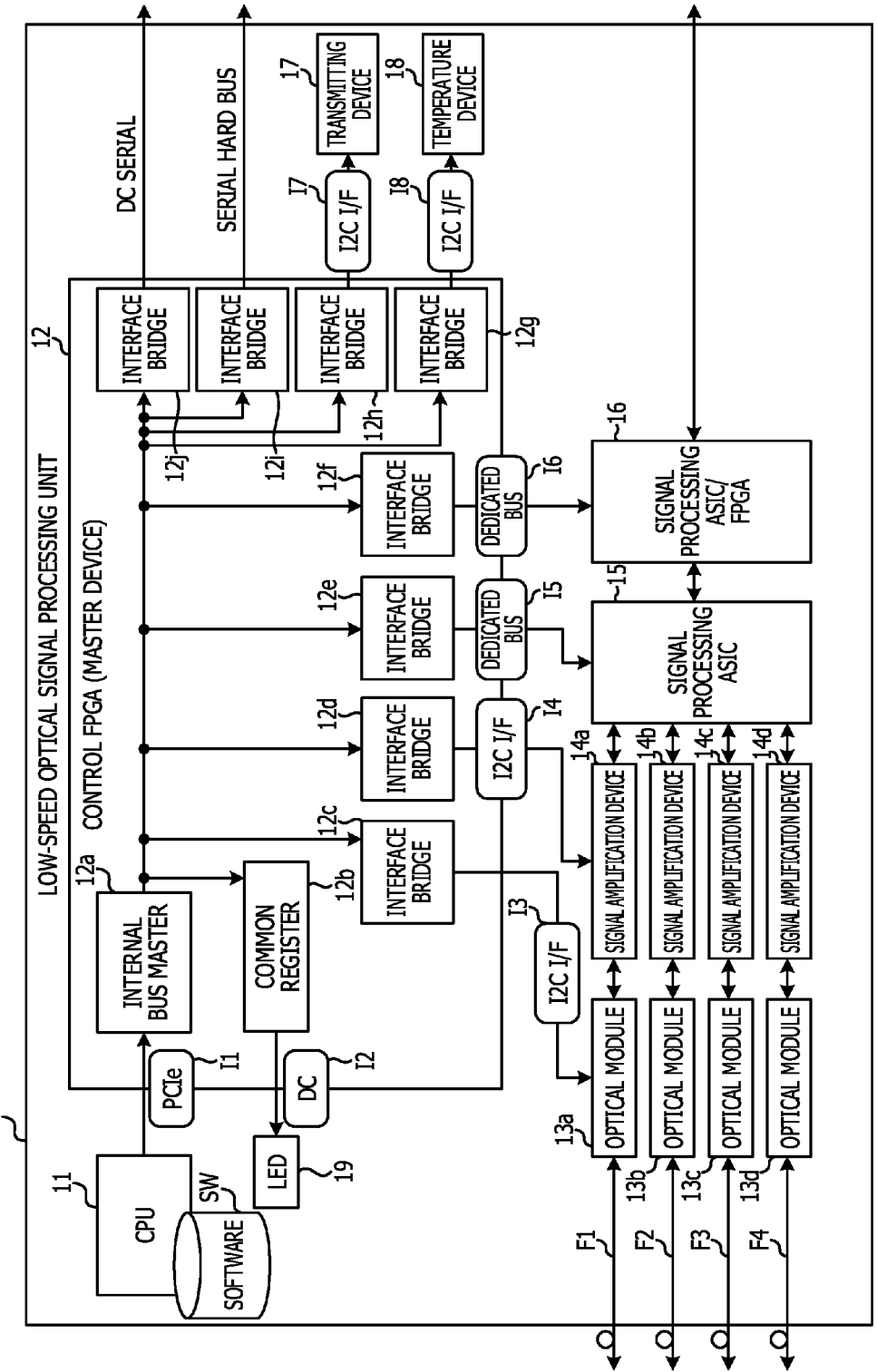
FIG. 1 is a block diagram illustrating an exemplary low-speed optical signal processing unit of an optical transmission apparatus.

An optical transmission apparatus includes, for example, a low-speed optical signal processing unit, a switching unit, and a high-speed optical signal processing unit. The low-speed optical signal processing unit converts a received optical signal into an electrical signal. The switching unit performs input/output of the electrical signal between respective optical signal processing units. The high-speed optical signal processing unit multiplexes a low-speed signal and transmits the multiplexed low-speed signal as a high-speed optical signal.

The low-speed optical signal processing unit of the optical transmission apparatus includes a single master device and a plurality of slave devices. The master device may be, for example, a Field Programmable Gate Array (FPGA) for control, and controls communications between a Central Processing Unit (CPU) and the plurality of slave devices. The plurality of slave devices may be, for example, an optical module, a signal amplification device, a transmitting device, or a temperature device. The communication between the plurality of slave devices and the master device is implemented by an Inter Integrated Circuit (I2C) interface. The constitutional elements of each slave device, for example, a control unit, a state detection unit, or a memory, may be controlled or monitored by the I2C interface.

In the I2C interface, the single master device is coupled with the plurality of slave devices through a bus and a bus signal is serially transmitted. The bus signal includes a clock signal output from a clock (SCL) terminal and a data signal output from a data (SDA) terminal of the master device. The master device selects a target slave device to be accessed among the plurality of slave devices coupled thereto through the I2C interface and outputs the clock signal and the data signal to the selected slave device.

In the I2C interface connection, for example, a clock terminal is shared between the plurality of slave devices and a data terminal is individualized for each slave device by the master device. However, for example, when the data signal is fixed to Low during toggling of the clock signal, a bus clear operation regulated in the I2C standards may be initiated to reset a slave device which is not a target to be accessed. For example, when the data signal is fixed to high impedance (Hi-Z) during the toggling of the clock signal, the slave device may become inoperable.

In another I2C interface connection, both the clock terminal and the data terminal are shared between the slave devices by the master device. However, when the master device allocates an address for selecting a target to be accessed to each of the slave devices, an address may be fixed according to a slave device side limitation and thus, an arbitrary address may not be allocated. Therefore, the plurality of slave devices may not be coupled to a common bus line, for example, a clock line which couples the clock terminal of the master device to each slave device or a data line which couples the data terminal of the master device to each slave device.

In still another I2C interface connection, both the clock terminal and the data terminal are individualized for each slave device by the master device. However, the number of terminals of the master device may be increased to twice the number of the slave devices. For example, in the optical transmission apparatus equipped with multiple slave devices such as optical modules, the number of terminals used by the master device may also be increased as the number of slave devices increases. Since the optical transmission apparatus requires high density mounting according to miniaturization, device mounting designing may become difficult according to an increase of the number of terminals of the master device, along with, for example, an increase of the number of wirings on a board.

FIG. 1 illustrates an exemplary low-speed optical signal processing unit of an optical transmission apparatus. As illustrated in FIG. 1, a low-speed optical signal processing unit 10 includes a CPU 11, a control for control FPGA 12

(hereinafter, referred to as the control FPGA 12), optical modules 13a to 13d, signal amplification devices 14a to 14d, a signal processing Application Specific Integrated Circuit (ASIC) 15, a signal processing ASIC/FPGA 16, a transmitting device 17, a temperature device 18, and an Light Emitting Diode (LED) 19. These respective components are coupled with each other in such a way that signals or data may be input/output in a unidirectional mode or a bidirectional mode.

The CPU 11 accesses the control FPGA 12 through a PCI (Peripheral Component Interconnect) Express interface I1 according to an instruction from software SW. The control FPGA 12 includes an internal bus master 12a responsible for interfacing with the CPU 11, a common register 12b responsible for interfacing with the LED 19, and interface bridges 12c to 12j responsible for interfacing with various devices.

The optical modules 13a to 13d are respectively connected to the optical fibers F1 to F4 to perform an optical-electric conversion. Main signal data converted from an optical signal to an electrical signal is amplified by the signal amplification devices 14a to 14d and input to the signal processing ASIC 15 and the signal processing ASIC/FPGA 16. The main signal data processed by the signal processing ASIC/FPGA 16 is output to other interface unit as the electrical signal.

The transmitting device 17 receives an input of bus signals (clock signal and data signal) from the control FPGA 12 through an I2C interface 17. Similarly, the temperature device 18 receives an input of bus signals from the control FPGA 12 through an I2C interface 18. The LED 19 receives an input of a DC signal from the common register 12b through a DC (Direct Current) interface 12.

Respective devices such as the optical modules 13a to 13d, the signal amplification devices 14a to 14d, the transmitting device 17, and the temperature device 18 are coupled with the control FPGA 12 by the I2C interface so that communications between the respective devices and the control FPGA 12 are made using the bus signals (clock signal and data signal). For example, the CPU 11 first accesses the control FPGA 12 when intending to access the optical modules 13a to 13d. The control FPGA 12 accesses the interface bridge 12c which corresponds to an address after the address is processed by the internal bus master 12a. The interface bridge 12c for the optical modules 13a to 13d processes the address and data input from the internal bus master 12a and generates a signal having an I2C communication format. The interface bridge 12c communicates with the optical modules 13a to 13d using the signal having the I2C communication format perform a control for the optical modules 13a to 13d or acquire data from the optical modules 13a to 13d.

The control FPGA 12 may function as the master device, and the respective devices such as the optical modules 13a to 13d, the signal amplification devices 14a to 14d, the transmitting device 17, and the temperature device 18 may function as the slave devices. The master device configured to control the plurality of slave devices has a plurality of clock terminals that correspond to the number of slave devices to be connected with each of the slave devices, and a single data terminal shared between the plurality of slave devices regardless of the number of slave devices. Each slave device is equipped with a single clock terminal and a single data terminal. The plurality of clock terminals equipped in the master device are respectively coupled with corresponding slave devices in a one-to-one relationship. The single data terminal equipped in the master device is shared between the data terminals of the respective slave devices and coupled with the slave devices.

Figure 2:
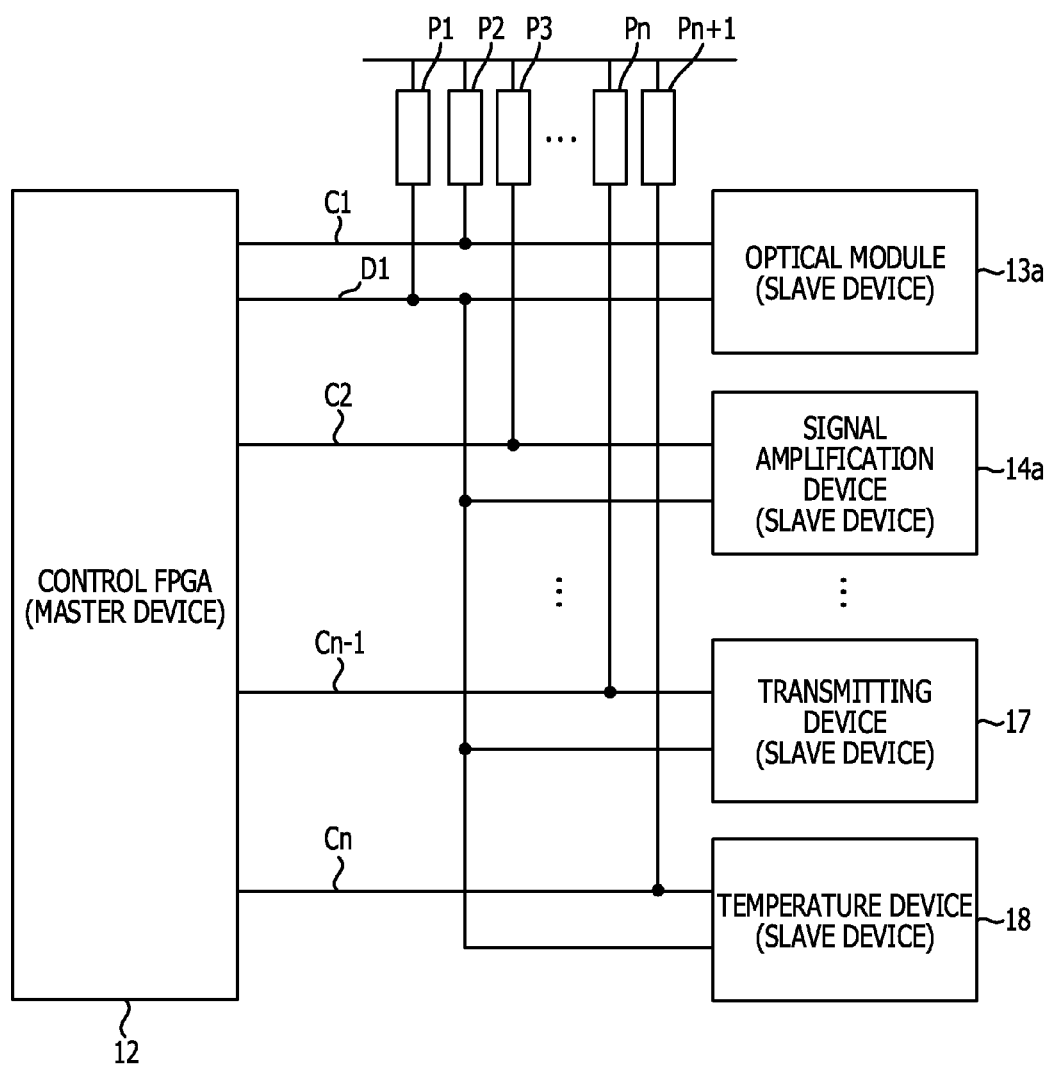
FIG. 2 is a diagram illustrating an exemplary connection between a master device and slave devices.

FIG. 2 illustrates an exemplary connection between a master device and slave devices. As illustrated in FIG. 2, clock (SCL) lines C1 to Cn (n is an integer of 2 or more) among bus lines of the I2C interface are individually coupled to each of the slave devices 13a, 14a, 17, and 18. A data (SDA) line D1 is coupled to each of the slave devices 13a, 14a, 17, and 18 in common. For example, the control FPGA 12 outputs a clock only to the clock line Cn−1 coupled to a transmitting device 17 which is a target to be accessed and fixes signals of the clock lines C1, C2, . . . , Cn coupled to other slave devices other than the transmitting device 17 to Low (clock output is fixed to "0"). Accordingly, the slave devices 13a, 14a, . . . and 18 coupled to the clock lines C1, C2, . . . and Cn, respectively, that are fixed to Low may not recognize the I2C access. Therefore, the control FPGA 12 may control any slave device, for example, only the transmitting device 17 while allowing the data line D1 to be shared.

In FIG. 2, the clock lines C1 to Cn and the data line D1 are connected to pull-up resistors P2 to Pn+1 and a pull-up resistor P1, respectively. Accordingly, in the control FPGA 12, the signals of all the bus lines, for example, the clock lines C1 to Cn and the data line D1 are set to be fixed to HIGH before execution of the I2C access, for example, at an initial state.

Figure 3:
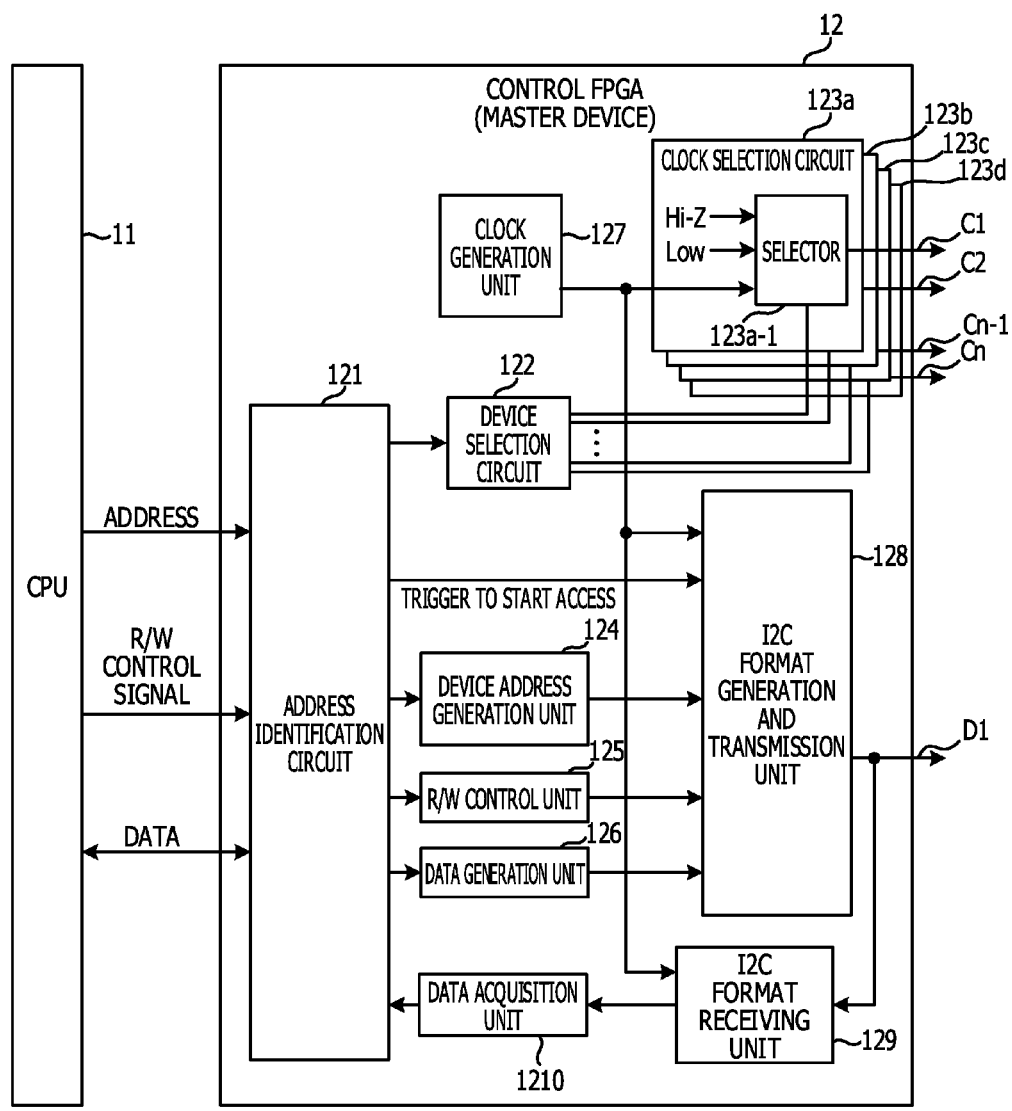
FIG. 3 is a block diagram illustrating an exemplary control FPGA.

FIG. 3 illustrates an exemplary configuration of a control FPGA. The CPU 11 is equipped with software and instructs the control FPGA 12 to communicate with the slave devices. For example, the CPU 11 generates an address, an R/W (Read/Write) control signal, and data which correspond to an accessing target slave device, and outputs them to the control FPGA 12. As illustrated in FIG. 3, the control FPGA 12 includes an address identification circuit 121 responsible for interfacing with the CPU 11. The address identification circuit 121 performs input/output of the address, the R/W control signal, and the data with respect to the CPU 11. The address identification circuit 121 outputs a control signal (hereinafter, referred to as a "device selection signal") for selecting the target slave device to be accessed using a decoded address and a trigger for starting accessing. An output timing of the device selection signal may be associated with an output timing of the trigger for starting accessing.

The device selection circuit 122 selects one of the clock lines C1 to Cn coupled to the target slave device to be accessed. The device selection circuit 122 outputs a control signal which pulls the clock signal of the target slave device to be accessed Low to a corresponding clock selection circuit among the clock selection circuits 123a to 123d, at access start timing. The device selection circuit 122 outputs a control signal which causes the target slave device to be accessed to transmit a clock at the timing delayed from the access start timing to the corresponding clock selection circuit among the clock selection circuits 123a to 123d. The device selection circuit 122 outputs a control signal, which pulls the clock signal of the target slave device to be accessed to high impedance, to the corresponding clock selection circuit among the clock selection circuits 123a to 123d upon the completion of the I2C access. The device selection circuit 122 outputs a control signal, which adds a predetermined amount of delay to the clock signals of the slave devices other than the accessing target slave device to change the clock signal of the slave devices from Low to high impedance, to the corresponding clock selection circuit among the clock selection circuits 123a to 123d.

A device address generation unit 124 generates a device address which is a portion of the I2C format using information decoded by the address identification circuit 121. An R/W control unit 125 generates an R/W bit, which is a portion of the I2C format, using information decoded by the address identification circuit 121. A data generation unit 126 generates data, which is a portion of the I2C format, using information decoded by the address identification circuit 121. A clock generation unit 127 generates a clock for the I2C communication. For example, the clock generation unit 127 generates a clock signal regulated in the I2C using an internal counter based on an operation clock of the control FPGA 12 as the master device.

An I2C format generation and transmission unit 128 combines information input from respective blocks of the device address generation unit 124, the R/W control unit 125, and the data generation unit 126 to generate the I2C format according to the clock generated by the clock generation unit 127. The I2C format generation and transmission unit 128 transmits data (I2C data) to the data line D1 at a trigger timing of starting accessing.

The clock selection circuits 123a to 123d determine a clock line, to which the clock is to be output, based on the input device selection signal. The clock selection circuits 123a to 123d select one of a High impedance (Hi-Z) output, a Low output, or a Clock output as the clock signal, based on the inputted device selection signal.

The device selection circuit 122 pulls the clock signal of the slave devices other than the target slave device to be accessed to the Low output at the access start timing. The device selection circuit 122 delays the clock signal of the accessing target slave device from the access start timing, and, then, makes the clock signal a Clock output generated by the clock generation unit 127. When the access is completed, the device selection circuit 122 changes the clock signal of the target slave device to be accessed from the Clock output to the High impedance output. The device selection circuit 122 adds a certain amount of delay to the clock signal of the slave devices other than the target slave device to be accessed, and then, changes the clock signal from the Low output to the High impedance output.

When the control FPGA 12 serving as the master device reads data from the slave devices, an I2C format receiving unit 129 recognizes the I2C format in the data signal with the clock generated by the clock generation unit 127. The I2C format receiving unit 129 recognizes an ACK (ACKnowledgement), a NACK (Negative ACKnowledgement), and data. A data acquisition unit 1210 acquires the data transmitted by the slave devices from the I2C format receiving unit 129 and outputs the acquired data to the address identification circuit 121.

Figure 4:
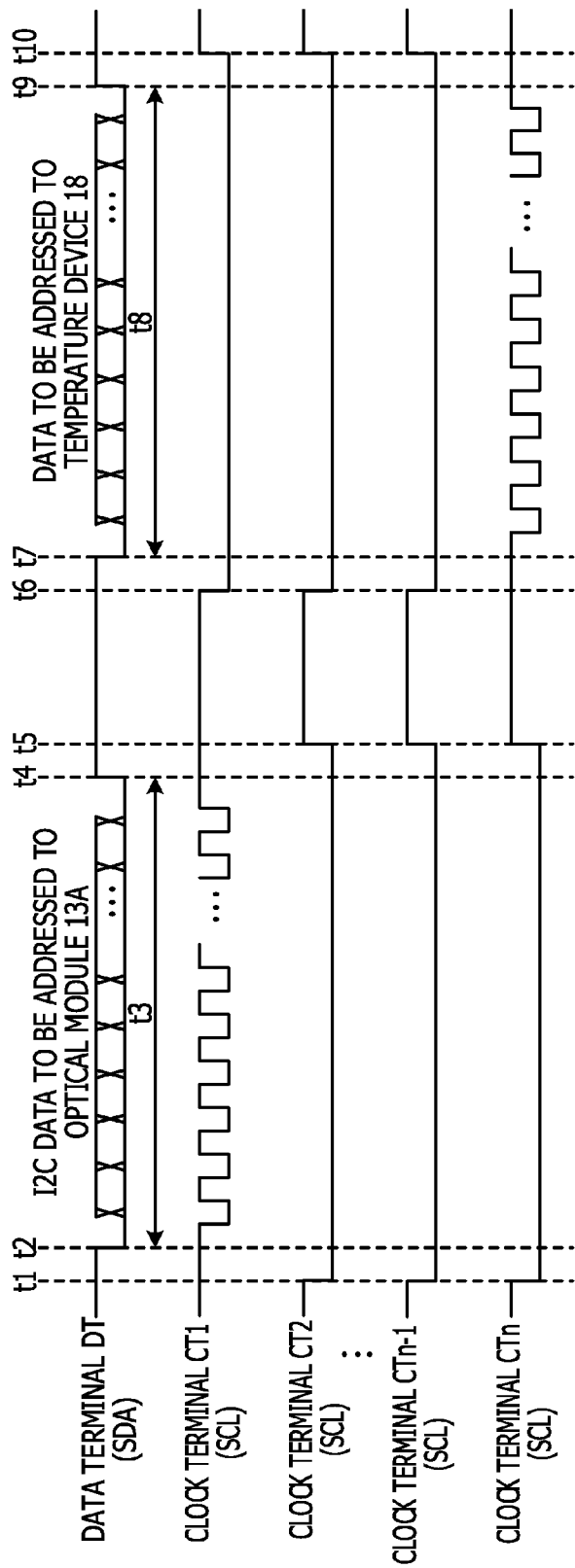
FIG. 4 is a waveform diagram illustrating exemplary waveforms.

FIG. 4 illustrates exemplary waveforms. A data transmission control method may be represented by the waveform diagram of FIG. 4. As illustrated in FIG. 4, at an initial state indicated by timing t1, the control FPGA 12 (master device) does not perform an I2C access on any slave device and pulls a data terminal DT and all the clock terminals CT1 to CTn to the High impedance output. During the High impedance output, since the data signal and the clock signals are pulled up by an external resistor on the bus, the data signal and the clock signals are fixed to HIGH.

When the control FPGA 12 performs the I2C access on a specific slave device, the address identification circuit 121 communicates with the CPU 11 to instruct the device selection circuit 122 to perform the I2C access. The device selection circuit 122 instructs the clock selection circuits 123a to 123d to output Low ("0", i.e., logic zero) to the clock terminals coupled to the slave devices other than the target slave device to be accessed. The device selection circuit 122 instructs the clock selection circuits 123a to 123d to output high impedance to the clock terminal coupled to the target slave device to be accessed.

At timing t2, the I2C format generation and transmission unit 128 changes the data terminal DT from the High impedance output to the Low output. Therefore, the control FPGA 12 (master device) shifts from the initial state to a "StartCondition" signifying the start of I2C access. In this case, the clock terminal CT1 recognizes occurrence of the I2C access under the condition that there has been a fall of data signal, for example, shift to a Low state, in the high impedance state. Since the clock signals of the slave devices other than the target slave device to be accessed are already in the Low output at timing t2, the clock terminals CT2 to CTn other than the clock terminal CT1 do not recognize the "StartCondition". For example, among the clock terminals CT1 to CTn, only the clock terminal CT1 detects the occurrence of the I2C access.

At timing t3, the control FPGA 12 provides an output in which the High impedance output and the Low output are toggled to the clock terminal CT1 which corresponds to the target slave device to be accessed. Therefore, the clock is supplied to the optical module 13a corresponding to the target slave device to be accessed. The control FPGA 12 serving as the master device outputs the signal in compliance with the I2C data format to be addressed to the optical module to the data terminal DT. When the data signal and the clock signal are received from the control FPGA 12, the optical module 13a sends back an ACK by setting an output for the data terminal DT to the Low output. Otherwise, when the data signal and the clock signal are received from the control FPGA 12, the optical module 13a performs a clock stretching output by setting an output for the clock terminal CT1 to the Low output.

At timing t4, the control FPGA 12 detects the completion of the I2C access to the target slave device to be accessed (optical module 13a) through the ACK or the stretched clock output. Upon detecting the completion of the I2C access, the I2C format generation and transmission unit 128 fixes the clock terminal CT1 to the High impedance output and switches the data terminal DT from the Low output to the High impedance output. Therefore, the control FPGA 12 (master device) shifts from the "StartCondition" to a "StopCondition" signifying the end of I2C access.

At timing t5, the control FPGA 12 also outputs the high impedance to the clock terminals CT2 to CTn that correspond to the slave devices other than the target slave device to be accessed similarly to the other terminals. Therefore, all the bus signals (clock signal and data signal) are returned to the initial state (state of timing t1).

Thereafter, when the target slave device to be accessed is changed, substantially the same processing as that for the optical module 13a is performed on the temperature device 18 which is the slave device after the change. The processing of the control FPGA 12 at respective timings t6 to t10 may be substantially the same as those at the timings t1 to t5 described above.

The low-speed optical signal processing unit 10 includes the control FPGA 12, the optical module 13a, and the signal amplification device 14a. The control FPGA 12 outputs a data signal shared by the optical module 13a and the signal amplification device 14a and the clock signals capable of individually controlling the optical module 13a and the signal amplification device 14a to each of the optical module 13a and the signal amplification device 14a. Accordingly, the control FPGA 12 controls the optical module 13a and the signal amplification device 14a. In the low-speed optical signal processing unit 10, the control FPGA 12 may output a clock signal having a predetermined logic level, for example, a Low level to a device other than the accessing target among the optical module 13a and the signal amplification device 14a. The control FPGA 12 may be coupled with the optical module 13a and the signal amplification device 14a by the I2C interface.

For example, a configuration, in which the data line D1 among the clock lines C1 to Cn and the data line D1 included in the I2C interface is shared, is adopted in the low-speed optical signal processing unit 10. Therefore, the control FPGA 12 serving as the master device individually controls the clock signals for the respective slave devices to cause only the slave device intended to access to individually recognize the I2C access.

In the low-speed optical signal processing unit 10, the slave devices having different communication speeds are coupled to a common data (SDA) line through a bus in order to supply the clock (SCL) signal only to the target slave device to be accessed. Accordingly, the number of terminals may be reduced in the low-speed optical signal processing unit 10. As illustrated in FIG. 2, in the low-speed optical signal processing unit 10, the number of connections between the master device and the slave devices may be suppressed to the number of the master devices plus one (1). In the low-speed optical signal processing unit 10, the clock signals for the slave devices other than the target slave device to be accessed are fixed to Low (clock output is set to "0"). Therefore, even when a bus clear regulated in the I2C standard is operated, a number of situations where the slave devices other than the target slave device to be accessed are reset is reduced. Even when the data signal is fixed to high impedance (Hi-Z) during toggling of the clock signal, operational failure of the slave device may not occur.

Figure 5:
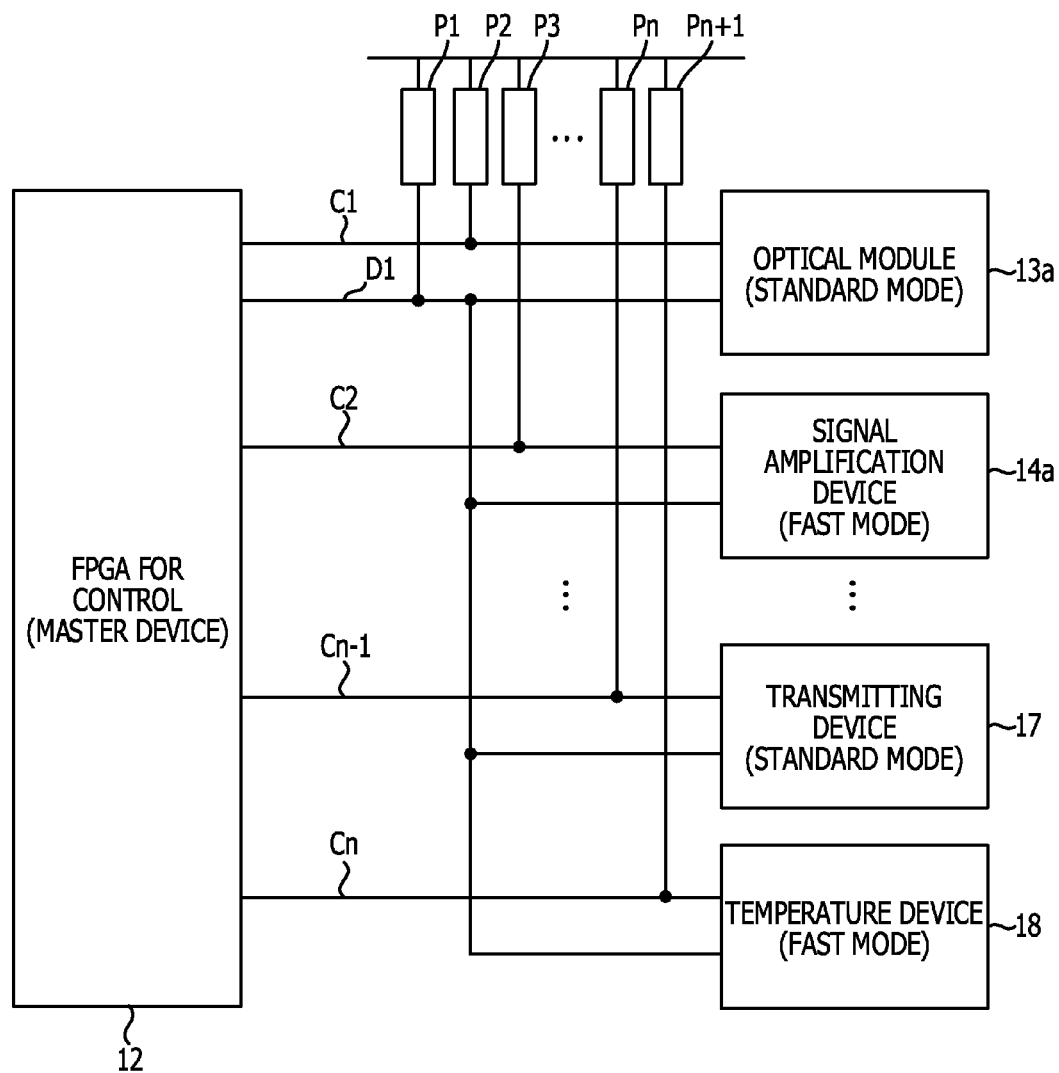
FIG. 5 is a diagram illustrating another exemplary connection between a master device and slave devices.
Figure 6:
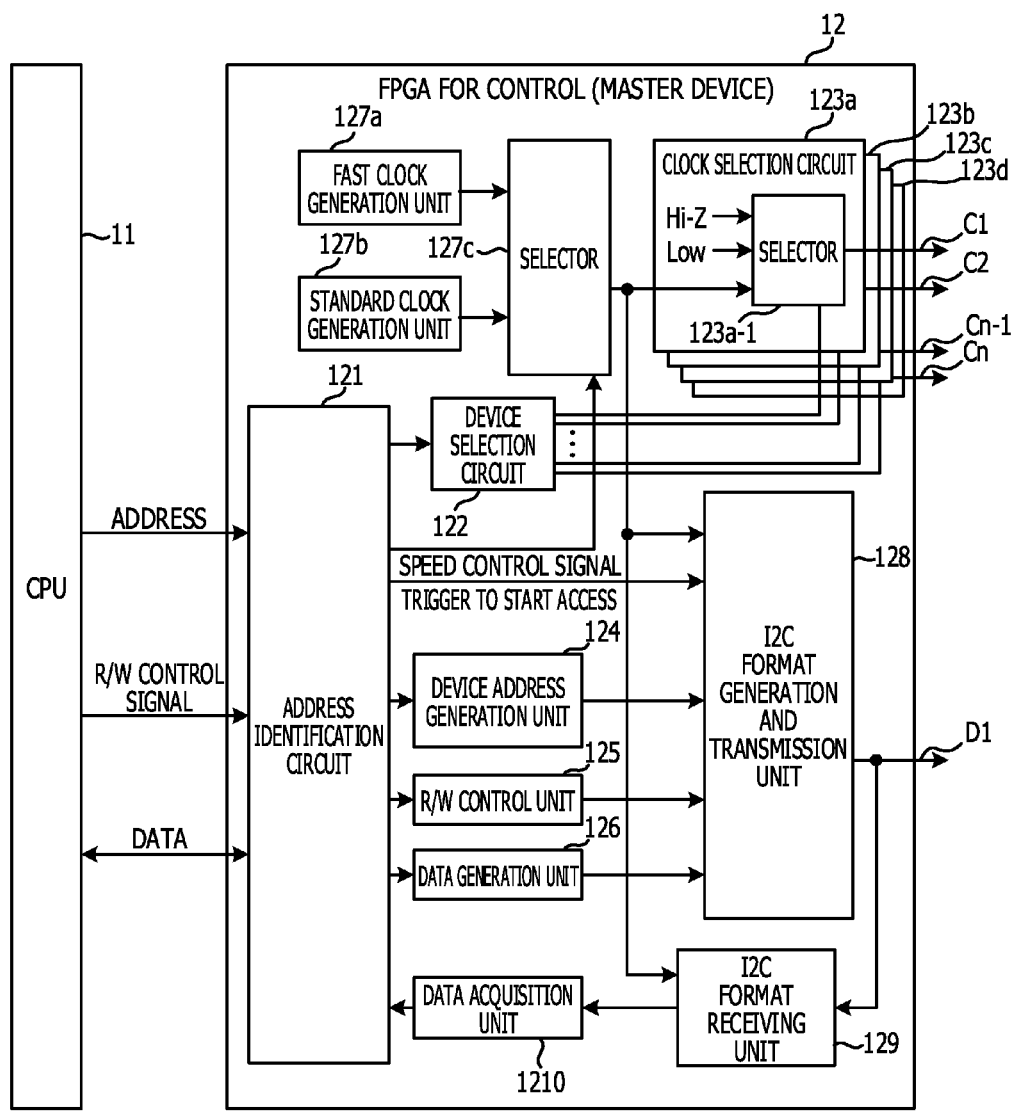
FIG. 6 is a block diagram illustrating another exemplary control FPGA.

FIG. 5 illustrates another exemplary connection between a master device and slave devices. FIG. 6 illustrates another exemplary control FPGA. The difference between the low-speed optical signal processing unit described above and the low-speed optical signal processing unit having the configuration illustrated in FIGS. 5 and 6 is the communication speed of the slave device. For example, all the communication speeds of the slave devices coupled to the control FPGA 12 may be substantially the same in the low-speed optical signal processing unit described above. In the low-speed optical signal processing unit having the configuration illustrated in FIGS. 5 and 6, at least one slave device having a different communication speed may be mixed.

The low-speed optical signal processing unit having the configuration illustrated in FIGS. 5 and 6 may have similar to or substantially the same as that of the low-speed optical signal processing unit 10 illustrated in FIG. 1. Therefore, in FIGS. 5 and 6, the same reference numerals are given to the constitutional elements which are shared with the low-speed optical signal processing unit illustrated in FIG. 1 and detailed descriptions thereof may be omitted or reduced. As illustrated in FIG. 5, regarding the communication speeds of the slave devices on the bus, the optical module 13a and the transmitting device 17 are clocked in a standard mode, for example, 100 (one hundred) clock pulses, while the signal amplification device 14a and the temperature device 18 are clocked in a high speed mode, for example, 400 (four hundreds) clock pulses. The control FPGA 12 of the low-speed optical signal processing unit 10 illustrated in FIG. 6 individually controls the respective clock terminals CT1 to CTn when executing the I2C access. Accordingly, even when the speeds of the coupled slave devices are different from each other, substantially the same control as the low-speed optical signal processing unit illustrated in FIG. 1 may be performed.

As illustrated in FIG. 6, the control FPGA 12 includes a plurality of constitutional elements that are shared with those of the control FPGA 12 illustrated in FIG. 3. Therefore, in FIG. 6, the same reference numerals are given to the constitutional elements which are shared with those of the control FPGA 12 illustrated in FIG. 3 and detailed descriptions thereof may be omitted or reduced. The address identification circuit 121 decodes the input address to determine what speed is used for performing an access by the I2C interface. The address identification circuit 121 outputs a speed control signal to the selector 127c and the selector 127c selects one of the clocks generated by a high-speed clock generation unit 127a and a standard clock generation unit 127b. The address identification circuit 121 activates the clock selection circuits 123a to 123d, the I2C format generation and transmission unit 128, and the I2C format receiving unit 129 based on the clock selected by the selector 127c.

FIG. 7 illustrates other exemplary waveforms. A data transfer control method may be implemented using the waveforms of FIG. 7. As illustrated in FIG. 7, at timing t13, a first I2C access by the control FPGA 12, for example, an access to the optical module 13a is executed in the standard mode. In contrast, at timing t18, a second I2C access by the control FPGA 12, for example, an access to the temperature device 18 is executed in the fast mode. In the low-speed optical signal processing unit 10 described above, the data transfer control by the control FPGA 12 may be performed even when different clock speeds exist together in the slave device side.

For example, the number of the slave devices connected to the control FPGA 12 illustrated in FIGS. 3 and 6 may be four or plural, for example, 20 to 30. In FIGS. 3 and 6, two slave devices among the four slave devices connected to the control FPGA 12 are operated in the standard mode. For example, a single or three slave devices may be operated in the standard mode. The speed of slave device may have a two-stage scheme consisting of a standard mode (e.g., 100 clock pulses) and a high speed mode (e.g., 400 clock pulses), or a three or more-stage scheme.

Respective constitutional elements of the optical transmission apparatus may not be physically configured as illustrated. For example, all or some of the respective apparatuses may be functionally or physically distributed or integrated in any unit according to various loads or use situation. For example, the signal processing ASIC 15 and the signal processing ASIC/FPGA 16 illustrated in FIG. 1, or the device address generation unit 124, the R/W control unit 125, and the data generation unit 126 illustrated in FIG. 3 may be integrated as a single constitutional element. Regarding the address identification circuit 121, a part that controls the device selection circuit 122 and a part that gives a trigger to initiate access to the I2C format generation and transmission unit 128 may be separated. The memory which stores a generated address, R/W control signal, or data may be externally connected to the optical transmission apparatus as an external apparatus through a network or cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a plurality of first devices; and
   a second device including a data output terminal coupled to a common data line which is coupled to each of data input terminals of the respective first devices and supplies a data signal to each of the data input terminals and a plurality of clock output terminals coupled to respective clock lines which are coupled to respective clock input terminals of the respective first devices and supplies a clock signal to the respective clock lines and configured to control the plurality of first devices individually based on the clock signal; and
   a device selection circuit configured to select one first device from among the plurality of first devices based on an input address; and
   a plurality of clock selection circuits coupled to the respective clock lines of the respective first devices and each configured to supply the clock signal, a first signal having a first level, and a second signal having a second level to the respective clock lines based on a selection result of the device selection circuit,
   wherein, when the device selection circuit selects the one first device in a state in which each of the plurality of clock selection circuits supplies the first signal to the respective clock lines, the clock selection circuit coupled to the selected first device, switches a supply to the respective clock lines from the first signal to the clock signal, and one or more clock selection circuits coupled to one or more remaining first devices other than the selected first device, switch a supply to the respective clock lines from the first signal to the second signal.

2. The transmission apparatus according to claim 1, wherein the one or more clock selection circuits are configured to start supplying the second signal to the respective clock lines at a first timing when an access to the selected first device starts and the clock selection circuit coupled to the selected first device is configured to start supplying the clock signal to the respective clock lines at a second timing obtained by delaying the first timing.

3. The transmission apparatus according to claim 1, wherein the second device is coupled with the plurality of first devices by an I2C (Inter Integrated Circuit) interface.

4. The transmission apparatus according to claim 1, wherein a communication speed of at least one of the plurality of first devices is different from a communication speed of the second device.

5. The transmission apparatus according to claim 1, wherein the second device includes:
   an address identification circuit configured to output a device selection signal for selecting one of the plurality of first devices as the selected first device based on the input address, and the device selection circuit is configured to output a control signal for controlling the clock signal based on the device selection signal.

6. The transmission apparatus according to claim 1, wherein the first signal is a high-impedance signal.

7. The transmission apparatus according to claim 6, wherein each of the plurality of clock selection circuits is coupled to a clock generation circuit which generates the clock signal.

8. The transmission apparatus according to claim 6, wherein the plurality of clock selection circuits each includes a selector configured to select one of the clock signal, the first signal and the second signal.

9. The transmission apparatus according to claim 1, wherein the second device includes an FPGA (Field Programmable Gate Array).

10. A transmission method comprising:
    transmitting a data signal from a data output terminal of a second device to each of a plurality of data input terminals of respective first devices through a common data line;
    supplying, by a plurality of clock selection circuits, a first signal to respective clock lines coupled to the respective first devices;
    selecting a first device from among the first devices in a state in which each of the plurality of clock selection circuits supplies the first signal to the respective clock lines;
    switching, by the clock selection circuit provided for the selected first device, a supply to the respective clock lines from the first signal to a clock signal when the first device is selected; and
    switching, by one or more clock selection circuits coupled to one or more remaining first devices other than the selected first device, a supply to the respective clock lines from the first signal to a second signal when the first device is selected.

11. The transmission method according to claim 10, further comprising:
    starting, by the one or more clock selection circuits, supplying the second signal to the respective clock lines at a first timing when an access to the selected first device starts; and
    starting, by the clock selection circuit provided for the selected first device, supplying the clock signal to the respective clock lines at a second timing obtained by delaying the first timing.

* * * * *